April 23, 1974     M. R. GASCO     3,806,364
PURIFICATION PROCESS OF RAW SUGAR BEET JUICE
Filed Nov. 12, 1971     3 Sheets-Sheet 2

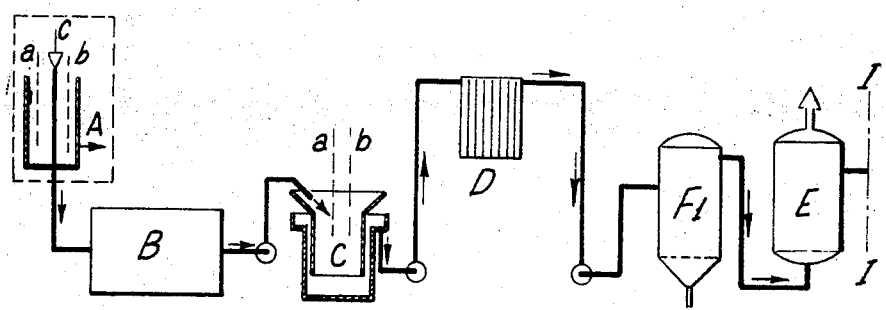
FIG. 1
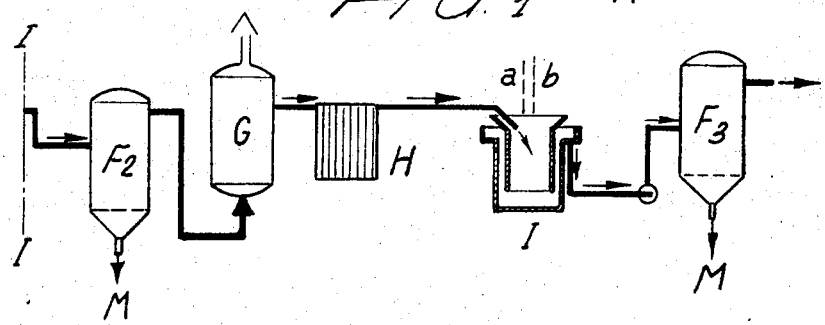
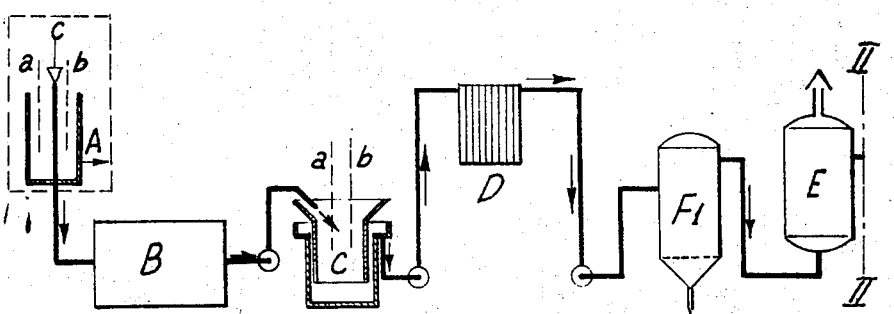
FIG. 2
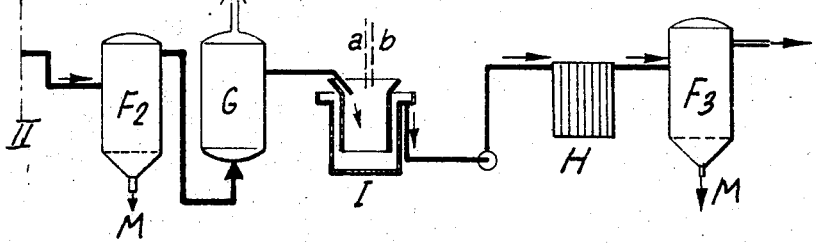

INVENTOR

MARIA R. GASCO

3,806,364
PURIFICATION PROCESS OF RAW SUGAR BEET JUICE

Maria Rosa Gasco, 207 Lungo Po Antonelli, Turin, Italy
Filed Nov. 12, 1971, Ser. No. 198,273
Claims priority, application Italy, Nov. 13, 1970, 31,713/70
Int. Cl. C13d *3/00, 3/06*
U.S. Cl. 127—48    9 Claims

ABSTRACT OF THE DISCLOSURE

A process and apparatus for purifying raw sugar beet juice comprising the steps of treating the juice with a composition comprising:

Component (a) a mixture of
   ($a_1$) an inorganic material selected from the group consisting of clay, silica, aluminum compound, and alkaline phosphate,
   ($a_2$) an organic material of the formula $$[N(R_1R_2R_3R_4)]X$$

wherein
   $R_1$ and $R_2$ are individually selected from the group consisting of alkyl and oxyalkyl,
   $R_3$ is phenyl, benzyl, alkylaryl, dialkylaryl,
   $R_4$ is an aliphatic chain $C_{10}$–$C_{16}$,
   X is $Cl^-$, $HSO_4^-$, $SO_4^=$, $CH_3COO^-$,
and/or ($a_3$) a polyethylene derivative of the type $$(HN-CH_2CH_2)n$$

having a molecular weight of 40,000,
and component (b) a commercial polyelectrolyte flocculating coadjuvant, such as polyacrylamide, both before and after the steps of liming and carbonatation of the juice to facilitate the separation of impurities present in the juice in the form of solids through filtration.

---

This invention relates to a process for the purification of raw sugar juice, derived from a diffusion plant of a beet sugar refinery.

This invention also relates to the so purified juice, regarded as an intermediate product, and to the plant for carrying out said process.

As it is well known, in beet processing factories, the processing of raw juice derived from diffusion, is carried out through a series of laborious operations, involving a considerable consumption of reagents, energy, heat, a considerable expenditure of time, a large overall area and, to sum up, a considerable cost, while the final juice obtained therefrom comes short of expectations, as far as the color and the content of "non-sugars" is concerned; this unfavorably affects the following operation of concentration within the evaporators, wherein abundant scales are produced or, if a preliminary ion exchange resin purification is provided, a quick exhaustion and marked degradation of such resins are expected.

The process according to this invention, which is the outcome of long researches, obviates to a great extent the above mentioned deficiencies and shortcomings, allowing to simplify the processing, to substantially reduce the whole cost and to obtain a purer and less colored juice.

The process by the present invention is further characterized by a particular flexibility of the various operations occurring during the process, enabling to adjust the latter to the requirements of the particular material being treated, so as to produce the best product with the best yield and the minimum cost in any single case.

The process acording to this invention essentially comprises the following operations:

(1) Preliminary purification of the raw juice, at 45°–70° C. (113–158° F.), by means of a particular compound additive, composition which will be described in detail hereinafter, said additive being constituted of (a) a mixture of components having a function of supporting ($a_1$) and demolishing the colloids and the dyestuffs ($a_2$ or ($a_2+a_3$)) respectively and (b) a flocculation coadjuvant means, active in the lightly acid field of raw sugar juices;

(2) Progressive predefecation by liming (0.15–0.4% CaO on the predefecated juice) up to an optimum, depending on the juice to be treated;

(3) Purification of the juice by adding the additive composition comprising the same components as described in (1), except that $a_2$ or $a_2+a_3$ are present in a different concentration than the one indicated in (1), and a flocculation coadjuvant (b) (2–4 p.p.m.) active in a basic field and having the same composition as stated in (1) or a different one;

(4) Heating, by heat exchange, at 80–90° C. (176–194° F.) for a few minutes;

(5) Filtering, which can be avoided, when suitable;

(6) Light carbonatation or saturation of the juice obtained at a pH value corresponding to the values of the first conventional carbonatation;

(7) Further heating, when necessary, for the further filtering;

(8) Filtering;

(9) Second carbonatation of the filtered juice at 70–75° C. (158–167° F.), up to values of 0.005–0.015% CaO, on the juice being treated;

(10) Short heating (2–3 minutes) by heat exchange (101°–103° C.) (213.8–217.4° F.);

(11) Third purification by adding the juice with an additive composition similar to the second additive, but having a different mixture ratio for its components;

(12) Filtering of the juice obtained therefrom and forwarding the juice to the further processing according to the conventional method.

The above illustrated operation flow-sheet besides substantially departing from the conventional one, is characterized by a particular flexibility, which allows variations of the operations, change of the order of the above described operations or omission of some operations when their presence is considered unnecessary: thus, for example, the preliminary purification may be carried out by directly letting the additive composition to the predefecator, where the raw juice from the diffusion arrives;

The carbonatation at (6) may be omitted, in which case only filtering is executed and only one carbonatation at 70–75° C. (158–167° F.) is carried out, where values of 0.005–0.015% CaO on the processed juice can be reached, while at the same time values below pH 8.3–8.5 are advantageously avoided in practice (thus avoiding formation of invert sugar);

The heating at (7) might be eliminated; the third purification also may be omitted, when a juice not particularly purified and decolorized is required; the heating operation and the third purification may be inverted.

Just from the foregoing, those skilled in the art will easily notice some substantial differences, involving important advantages with respect to the conventional process, and namely:

Introduction of a purification stage (1), preliminary to predefecation, wherein the juice is subjected to a pretreatment by means of a particular additive composition having a flocculating and decolorizing action, thereby making the following predefection more efficient;

Elimination, after predefecation of the conventional defecation, which is a particularly troublesome, cumbersome and expensive operation;

Introduction, after predefecation, of a second purification stage, still carried out by means of the special additive as in (1), this additive being however modified so as to meet the requirements of the juice composition at this stage;

Introduction of a filtering stage prior to carbonatation, this operation being impossible in conventional processes and enabling to send to the carbonatation stage, after the treatment carried out at stages (1)–(3), a juice already purified of colloidal substances to a high degree; thus making considerably easier the successive operation of carbonatation;

The third purification executed before final filtering, allowing the obtaining of a particularly pure and decolorized juice.

Describing now in detail the single stages of the process according to the invention, it will be first noted that one of the main features of this process is the employment of a special additive composition in all of the three stages of purification provided through the process.

As already said, the additive composition consists of two essential components, i.e. (a) a mixture having a flocculating and decolorizing action and (b) a flocculation coadjuvant.

The mixture (a) is comprised of ($a_1$) inorganic substances chosen among montmorillonite clays, kaolin, bentonite and modified bentonites, fuller's earths, various types of kieselguhr, attapulgite, sepiolite, bauxite, aluminum oxide and salts, sodium and potassium aluminates, alkaline phosphates, such as bisodium, trisodium, monopotassium phosphates and ammonium phosphates, alkaline polyphosphates and polymetaphosphates, silicon dioxide and the like, having substantially a support function for the other components of the mixture, and also, if necessary, of purification coadjuvants; in this latter case a preliminary mechanical treatment is provided to give them such a property; of ($a_2$) organic substances apt to demolish colloids and coloring matters, such as a not toxic, quaternary nitrogen salt (2.5–12.5% of (a)) having the general formula:

$$[N(R_1R_2R_3R_4)]X$$

where $R_1$ and $R_2$ can be the same or different or they can be a lower alkyl group (such as a methyl, ethyl, propyl group), or an oxyalkyl group (such as oxymethyl, oxyethyl, oxypropyl group); $R_3$ can be a phenyl, benzyl or an alkylaryl group (such as a methylphenyl, ethylphenyl group) or a dialkylaryl group (such as a dimethylphenyl group); $R_4$ can be an aliphatic chain $C_{10}$–$C_{15}$, preferably $C_{12}$–$C_{14}$; X illustrates the salifying portion of the quaternary sodium salt and is selected in particular among $Cl^-$, $HSO_4^-$, $SO_4^{--}$, $CH_3COO^-$; and possibly ($a_3$) of a not toxic polyethyleniminic derivative, having molecular weight not less than 40,000 and the general formula $(CH_2CH_2NH)_n$.

Coadjuvant (b) is made of a commercial flocculation coadjuvant, preferably a polyelectrolyte.

As mentioned before, the additive can be modified, both qualitatively and quantitatively, within the above defined limits according to the juice composition in each stage of purification. Thus, in the preliminary purification mixture ($a_1$) corresponds to 100–300 g./cu. m. of juice; where ($a_2$) is about 2.5–12.5% and ($a_3$) is about 1–10%; (b) corresponds to about 2–4 p.p.m. of the juice; moreover (b) is active in a low acid field such as that of the raw sugar juices (for instance a commercial polyacrylamide).

On the contrary in the second purification the required proportion of mixture ($a_1$) is 50–250 g./cu. m. and a concentration of ($a_2$) from 1 to 7.5% and of ($a_3$) from 1 to 7.5% is preferred and the flocculation coadjuvant (b) (2–4 p.p.m.) is active in a basic field and can be the same as used in (1) or a different one.

In the third purification:

Finally it should be observed that additive (a) used in (1), as the similar additives used in the successive operations of purification, have been purposely studied in powder, so as not to change the volumes of the juices due to addition of solutions.

The predefecation stage goes on in a way similar as in the conventional processes, though made easier by the preliminary purification, which yields a juice which is more sensitive to the action of the liming, than the raw juice.

Before continuing the investigation of the process by this invention, it is appropriate to call the attention on the important feature which characterizes this process, consisting in the elimination of the conventional stage of defecation or liming carbonatation, with the consequent exceptional advantages being involved, as any practitioner in the sugar refinery art will not miss; it is in fact an operation which is generally carried out at about 80° C. (176° F.), with large addition of lime, which can amount up to 2% (including the 0.15–0.4% CaO of the predefecated juice).

This elimination also yields as a natural consequence a reduction of calcium oxide to be introduced in the system, said oxide being required in considerable quantity, due to the mass of juice to be processed; also a considerable reduction (about ⅕–1/10) of the large calcining furnaces and of the large conventional mixer-reservoirs for the liming and, consequently, a reduction of the circulating liming (containing 18–22% CaO), also a strong reduction of the quantity of carbon dioxide needed for the first saturation of the added liming; a considerable reduction of the volume of water to evaporate and of the heat consumption, a considerable reduction of the circulating mud and of the dry residue in the mud; the latter is an advantage to be particularly appreciated in that it involves, alongside the reduction of the encumbrance and the mass to eliminate, a considerable reduction of the loss of sugar carried by the mud; in fact the quantity of mud coming from the filtering at (5) is about ⅕ of the quantity generally formed in the first filtering of the conventional process; this means, for example, that out of about 100 kgs. of mud, obtained with the known methods from 1 cu. m. of juice, consisting of 50% of dry mud and 50% of sugar juice (for example with 10% of sugar), 5 kgs. of sugar per cu. m. of mud generally go to the mud; whereas, by the following process, only about 1 kg. of sugar per cu. m. goes to the mud and therefore about 4 kgs. of sugar per cu. m. go directly into the sugar juice, as opposed to the conventional processes.

As a result, the costs of the machinery, of the overall plant encumbrance, of maintenance and therefore, to sum up, of production are of course reduced.

It will be appreciated that in the process by this invention the juice leaving the predefecation is subjected to an operation of purification by means of the above illustrated compound additive, operation which, in a sense, replaces the conventional liming carbonatation, being much simpler and effective than the latter besides being much less expensive, as already mentioned.

Thus, it will be found that juice from operation (3) can be directly filtered, since no colloidal substances are practically present therein, unlike the case of conventional defecated juice; indeed in the latter, as in predefecated juice, the presence of such colloidal substances in solution excludes any possibility of directly filtering the juice prior to carbonatation and, moreover, even after carbonatation filtering is not always satisfactory.

In connection with this unique juice filterability, it is therefore possible and preferred in the process according to the invention to introduce a filtering preliminary to carbonatation; thus, in the juice from the purifying means, following predefecation and heating, the colloidal substances have been almost completely flocculated and juice is at the same conditions of pH and CaO content which exhibit an optimum purification: therefore, the juice can be directly filtered, that is prior to carbonatation; thus, the flocculated colloidal substances are retained on the filter and the carbonatation step is supplied with a juice substantially free of such substances and therefore not providing the phenomenon of partial redissolution of the colloidal substances, which could occur as carbonatation is being carried out in conventional processes; in the latter case, on the contrary, the juice being supplied to carbonatation will contain flocculated substances which, as a result of pH lowering, as caused by the introduction of carbonatating carbon dioxide ($CO_2$), are liable to pass partly again in colloidal solution and, as such, are forwarded and provide the well known and deprecated disadvantages occurring throughout the further course of juice processing.

Conversely, by operating according to the present invention as above described, the successive operations being accomplished in a substantial absence of colloidal substances are extremely simplified and efficient; within the evaporators the usual scales are reduced; filtering of the thick juice and syrup is made easier; raw sugar is less colored; as a whole, the processing is more uniform and economical, largely avoiding the slowdowns, frequently occurring in conventional processes.

As above mentioned following filtering prior to carbonatation, the latter is performed without any difficulty and next filtering (8) is no more a problem, since now the precipitate is prevailingly of an inorganic character. The same can be stated for the second carbonatation of the filtered juice.

The last purification is for further removing any "nonsugars" still present, and reducing coloration which could have been made again more intense by heat operations 4 to 10. However, where a particularly purified and decolored juice is not required, the latter operation can be dispensed with.

By operating according to the process of the present invention as above described, by far better juices are obtained at the several processing steps, the juices having a reduction in colloidal substance content and coloration, an increase in purity ratio of at least 0.5–4 degrees relative to a conventional juice, as a result of a higher purification and less degradation of sucrose, 20–30% reduction in saline juice level relative to a corresponding conventional juice, owing to the use of the particular additive as claimed in the present invention. As above mentioned, these advantages will have of course repercussion on the further processing of the juice to sugar.

For a better understanding of the process for purifying raw beet sugar juices according to the present invention, the processing layout will be described hereinafter on the ground of a plant scheme, essentially providing all of the operations described and also forming the subject of this invention.

In said scheme, as shown in FIG. 1 of the appended drawings, the raw juice from diffusion $c$, the additive $a$ and the flocculation coadjuvant $b$ are separately fed to any known type of mixing device A allowing a thorough mixing of the introduced substances, and a preliminary purification is started.

Accordinng to a modified embodiment, the additives $a$ and $b$ can also be directly supplied ahead of the predefecating means, at which the sugar juice arrives directly from diffusion. In this case A would be omitted, as shown by dashed lines in the drawings (FIGS. 1–4 and, better, in FIG. 5).

The so-added juice is supplied (FIG. 1) to a conventional type of continuous progressive predefecating means B, the whitewash (preferably 0.15–0.2% CaO on the predefecate) being also introduced therein and where a higher purification is performed than that in conventional system predefecation; therefrom the whole mass is directly supplied to a depurator C, where it is kept for 10–20 minutes, without any further addition of heat, and where as above described, the mixture $a$ and flocculation coadjuvant $b$ are introduced.

Those skilled in the art known that at this point of the conventional plant the defecating means is located, where- in the predefecated juice is treated with a substantial amount of lime and particularly, as mentioned, to have a total amount of about 2% CaO, for an extended dwell time (about 20 minutes) at about 80° C. (176° F.).

Conversely, in the system according to the invention the processed juice from the depurator directly passes through a battery of heat exchangers D, where it is heated at 80–90° C. (26.7–32.2° F.). A peculiar feature of this invention is that the so-heated juice directly passes through a first filtering battery $F_1$, preferably comprising thickening filters, and therefrom successively to a first conventional type of carbonatating means (carbonator) or saturator E; to a second battery of filters $F_2$ and to a conventional type of second saturator G and, if required, to a waiting-box (not shown); next, the juice passes to a battery of heat exchangers H at 102–103° C. (about 216° F.); then to a second depurator I, where said mixture $a$ and flocculation coadjuvant $b$ are introduced, in a total amount and ratios of the individual components respectively different from those contemplated at A and C; here, the dwell time is 8–15 minutes. Thus, the colloidal substances are almost completely eliminated and, with respect to the conventional light juice, color is reduced to about 15–30% in colories stammer percent Brix; juice passes to a third battery of filters $F_3$, an extremely pure and decolored sugar juice being yielded therefrom and supplied to further processing, as above described.

As depurators use may be made of: reactors and/or flocculators.

Of course, the system is completed by transfer pipes and pumps, as also shown in the appended scheme.

Preferably, where powders (mixture ($a_1$)–($a_3$)) are involved, metering is accomplished by means of a metering and vibrating device and, where solutions are involved, such as preferably for the flocculation coadjuvant, by means of a metering pump.

The sludges of the filter batteries can be accumulated and supplied to a desugaring filter, from where the sugar solution is recycled as in the conventional system, or, if desired, the sludge of the second filter battery can be recycled to the predefecating means.

As above noted, this invention enables to carry out some modified embodiments within the scope of the inventive concept. Hereinafter some examples are given, merely by way of not limiting illustration and described on the ground of the appended drawings in which:

FIG. 1 shows a complete plant scheme;

FIG. 2 shows a plant scheme according to FIG. 1, but wherein the position of purifier I and heater H are inverted with respect to FIG. 1;

EXAMPLE 1 (FIG. 2)

Figure 3:
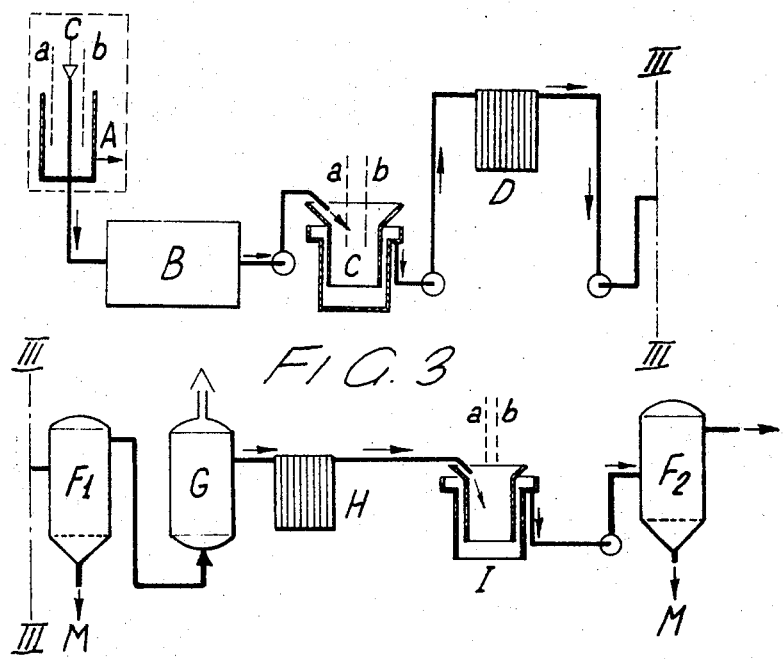
FIG. 3 is a plant scheme contemplating a single carbonatation.
Figure 4:
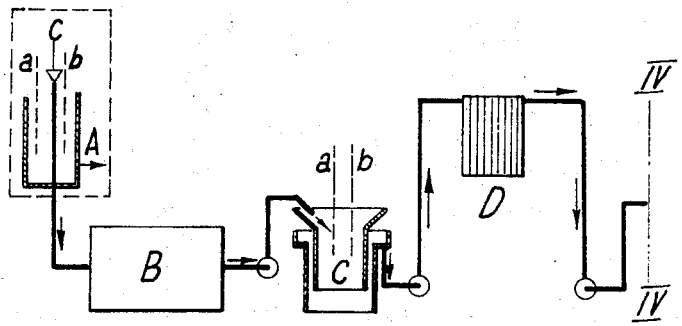
FIG. 4 is a plant scheme with a single carbonatation, wherein the positions of purifier I and heater H have been inverted with respect to FIG. 3.
Figure 4:
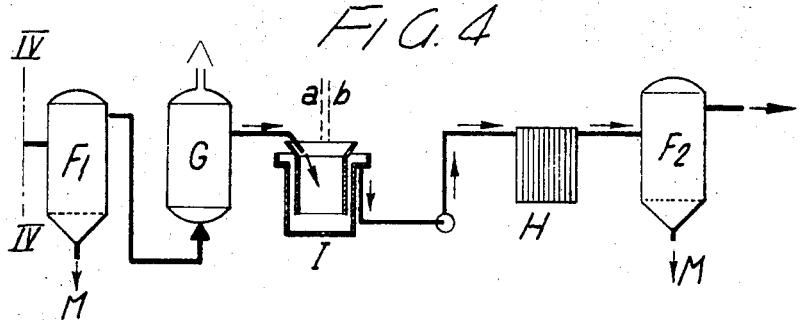
Figure 5:
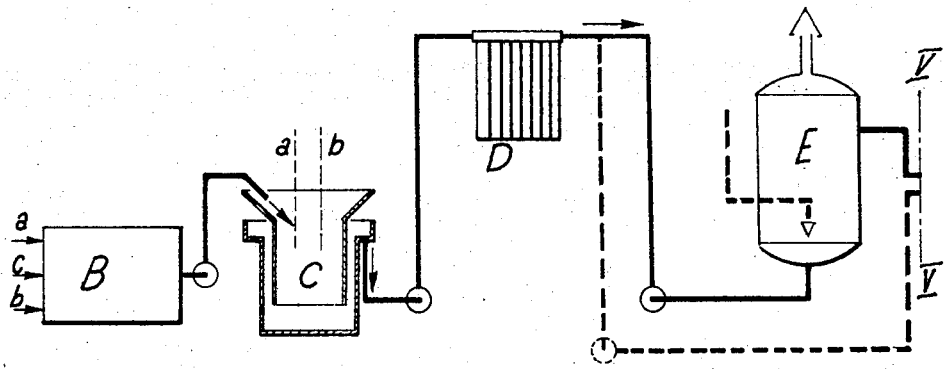
FIG. 5 is a plant scheme without mixing device and filter preceding to first carbonation.
Figure 5:
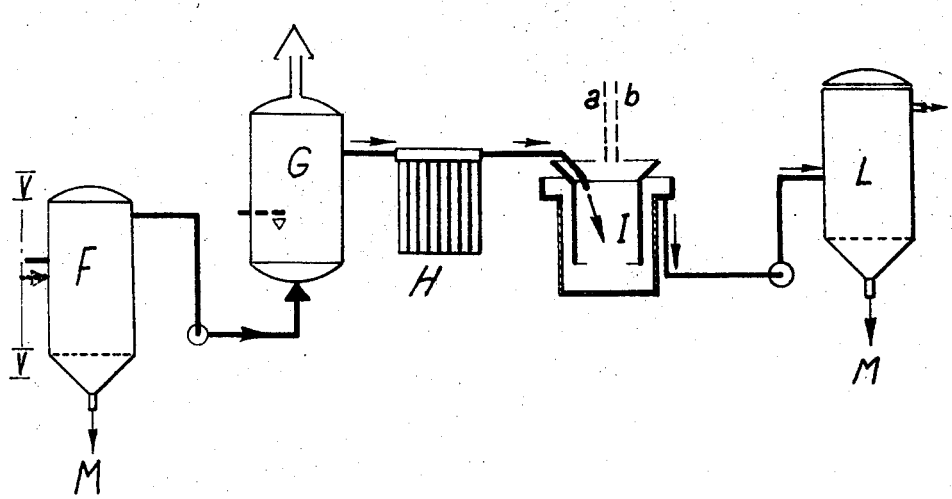

In a pilot plant having a capacity of 3 cu. m./h., 220 p.p.m. of AIS (from Donà S.A.S.) and 3 p.p.m. of coadjuvant 1007 RD (Donà S.A.S.) along with 3 cu. m./h. of a juice from diffusion having a sugar content of 83.2 (day average) and pH 6.6–6.8 at 50–60° C. (122–140° F.) are introduced into a mixer where a thorough mixing thereof is performed; therefrom the juice is supplied to a predefecating means, where such an amount of lime is added as to provide an alkalinity for the predefecate of about 0.22% CaO and where it dwells for 20 minutes at the same mixing temperature. Then, the whole mass is fed to purifier C, where at the same time 150 p.p.m. A and 115 p.p.m. C coadjuvant 1007 RD (Donà S.A.S.) are introduced, for a dwell time of 12 minutes at about 50° C. (122° F.); therefrom, the processed juice passes through a heat exchanger raising it to 83–86° C. (181.4–

186.8° F.) to the thickening filters $F_1$, from where the sludge is exhausted while the filtrates having a pH of about 10.7, are supplied to the first saturator, therein undergoing a slight carbonatation to a pH 10.4–10.5, with the building up of a small amount of a precipitate of essentially inorganic character. The juice is then easily filtered at the next filtering stage $F_2$, therefrom passing to a second saturator G yielding a juice at 0.05–0.06% CaO and pH 8.3–8.5 which directly passes to purifier I, into which 14 p.p.m. "BS" (Donà S.A.S.) and 2 p.p.m. coadjuvant 1007 RD are introduced with a dwell time of 10 minutes; then, through a heat exchanger H, raising it to 102–103° C. (about 216° F.), it reaches the last filter $F_3$. It is obtained a final filtrate, or the so-called "light juice," having the following characteristics as compared with a light juice obtained according to conventional methods.

CHARACTERISTICS OF LIGHT JUICES

| | Sugar content (day average) | Colories St. per-cent Bx | Conductivity ($\mu$ S) |
|---|---|---|---|
| According to— | | | |
| The invention | 90.1 | 0.21–0.32 | 4,100–4,300 |
| A conventional method | 88.3 | 0.41–0.56 | 5,200–5,400 |

EXAMPLE 2 (FIG. 3)

In a pilot plant having a capacity of 100 liters/h. and ahead of the predefecating means B, at which the raw sugar juices at pH 6.5–6.8 and sugar content 83.4 (day average) arrive, 200 p.p.m. AIS (Donà S.A.S.) and 3 p.p.m. coadjuvant 1007 RD are directly introduced; then adding with such an amount of lime as to obtain a predefecated juice at varying alkalinity in the range of 0.195–0.2% CaO; the juice is supplied to a purifier-reactor C where it is added with 130 p.p.m. AIIS and 3 p.p.m. coadjuvant 1007 RD and dwells for 15 minutes; then, through a heat exchanger D raising it to 84–86° C. (about 185° F.), it is supplied to the thickening filters $F_1$; the filtrate at about 10.8 pH is supplied to saturator G, where it undergoes a single saturation to about 8.5 pH. The outcoming juice is supplied to the boiler-exchanger H at 102–103° C. (about 216° F.) and then to purifier I, where 140 p.p.m. coadjuvant 1007 RD are introduced; therefrom the juice arrives at the final filter $F_2$, from where a light juice is yielded and has the following characteristics.

CHARACTERISTICS OF LIGHT JUICES

| | Sugar content (day average) | Colories St. per-cent Bx | Conductivity ($\mu$ S) |
|---|---|---|---|
| According to— | | | |
| The invention | 89.8 | 0.30–0.35 | 3,900–4,100 |
| A conventional method | 88.2 | 0.45–0.50 | 4,800–5,200 |

EXAMPLE 3 (FIG. 4)

The same procedure as in Example 2 is followed, with the difference that exchanger H is between purifier I and filter $F_2$, similar results being obtained.

EXAMPLE 4 (FIG. 5)

The juice from diffusion (day average of sugar content 82.8 and pH 6.5–6.7) is caused to directly reach at 50–60° C. (122–140° F.) and at a capacity of 3 cu. m./h. the first section of the predefecating means B, where it is added with 200 p.p.m. AIS and 3 p.p.m. coadjuvant 1007 RD. Here, lime is introduced to obtain 0.20–0.22% CaO on the predefecate. The outcoming predefecate is supplied to purifier C (dwell time 10 minutes), where it is added with 180 p.p.m. AIIS and 3 p.p.m. coadjuvant 1007 RD; therefrom it is supplied to exchanger D where it reaches a temperature of 83–87° C. (181.4–188.6° F.) and then to a saturator E, where it is carbonated to obtain a pH of 10.5–10.6 and therefrom to the thickening filter $F_1$, where the sugar sludges are separated and supplied to the desugaring device. The filtered juice undergoes a second carbonatation in saturator G to a pH of 8.4–8.5 and then through an exchanger H at 102–103° C. (about 216° F.) to the depurator I (dwell time 8 minutes) and added with 150 p.p.m. BS and 2–3 p.p.m. coadjuvant 1007 RD. Finally, this treated juice is supplied to filter L, yielding therefrom a light juice having the following characteristics as compared with a similar juice provided according to conventional methods.

CHARACTERISTICS OF LIGHT JUICES

| | Sugar content (day average) | Colories St. per-cent Bx | Conductivity ($\mu$ S) |
|---|---|---|---|
| According to— | | | |
| The invention | 90.4 | 0.28–0.35 | 4,100–4,300 |
| A conventional method | 88.5 | 0.48–0.52 | 5,000–5,200 |

What is claimed is:

1. In a process of purifying raw juice derived from the extraction of sugar beets prior to the refining process including treatment with CaO and carbonatation, the improvement comprising (1) treating the slightly acidic raw sugar beet juice prior to the introduction of CaO with (a) a mixture of: ($a_1$) an inorganic suspending agent selected from the group consisting of montmorillonite clays, kaolin, bentonite and modified bentonites, fuller's earths, various types of diatomite, kieselguhr, sepiolite, bauxite, aluminum oxide and aluminum salts, sodium and potassium aluminates, alkaline phosphates, ammonium phosphates, alkaline polyphosphates, silica and mixtures thereof, and a material selected from the group consisting of ($a_2$) and ($a_2$)+($a_3$) wherein ($a_2$) is a non-toxic organic quarternary nitrogen salt decolorant and ($a_3$) is a non-toxic polyethyleneamine and (b) a flocculating polyacrylic coadjuvant, (2) introducing CaO to render the juice alkaline, (3) treating the juice with further purifying quantities of a mixture of (a) and (b) and (4) filtering the resulting mixture prior to carbonatation.

2. A process for purifying raw sugar juice as claimed in claim 1, wherein said inorganic materials are subjected to a preliminary mechanical treatment imparting thereto a coadjuvant property of purification as well as of support.

3. A process for purifying raw beet sugar juice as claimed in claim 1, wherein $a_2$ is selected among organic materials capable of demolishing colloids and colorants consisting of non-toxic quaternary nitrogen salts, having the general formula:

$$[N(R_1R_2R_3R_4)]X$$

wherein: $R_1$ and $R_2$ are the same or different and are lower alkyl or oxyalkyl; $R_3$ is a phenyl, benzyl or an alkaryl or dialkaryl; $R_4$ is an aliphatic chain $C_{10}$–$C_{16}$; X is the salifying portion in the quaternary nitrogen salt and is selected among $Cl^-$, $HSO_4^-$, $SO_4^{--}$ and $CH_3COO^-$.

4. A process for purifying raw beet sugar juice as claimed in claim 1, wherein $a_3$ is a non-toxic polyethylene derivative (HN—$CH_2CH_2$)$_n$ having a molecular weight not less than 40,000.

5. A process for purifying raw sugar juice as claimed in claim 1, wherein the mixture (a) is introduced into a mixer in the form of a powder.

6. The process as claimed in claim 1 comprising the successive steps of
(1) treating the juice with a comopsition comprising:
(a) a mixture of
($a_1$) an organic agent selected from the group consisting of clay, silica, aluminum compound, and alkaline phosphate;
($a_2$) an organic decolorant of the formula $$[N(R_1R_2R_3R_4)]X$$

wherein
$R_1$ and $R_2$ are individually selected from the group consisting of alkyl and oxyalkyl;

$R_3$ is phenyl, benzyl, alkylaryl, dialkylaryl;
$R_4$ is an aliphatic chain $C_{10}$-$C_{16}$;
X is $Cl^-$, $HSO_4^-$, $SO_4^=$, $CH_3COO^-$;
and ($a_3$) a polyethyleneamine of the formula $$(HN-CH_2CH_2)_n$$

having a molecular weight of 40,000;
and (b) a polyacrylamide as a flocculating coadjuvant;

(2) predefecating with 0.15 to 0.4% CaO;
(3) adding the composition of step (1) to the juice from step (2), said resultant juice being maintained at 80° to 90° C.;
(4) filtering to eliminate solids from the juice;
(5) carbonatating the juice at 70° to 75° C. to attain a pH of 8.3 to 8.5; and
(6) filtering to separate any remaining solids whereby a purified juice is obtained.

7. The process of claim 6 further comprising the steps of
(1) first purifying the juice at 45° to 75° C. with the composition of claim 6, wherein the components are present to the extent of
   (a) 100 to 300 grams per cubic meter of the juice wherein (a) comprises 2.5 to 12.5 weight percent of ($a_2$) and 1 to 10 weight percent of ($a_3$); and (b) 2 to 4 p.p.m. of the juice;
(2) predefecating the juice with 0.15 to 0.4 weight percent of CaO to attain a pH of 10.7 to 10.8;
(3) second purifying of the juice with the composition of step (1) wherein the components are present to the extent of
   (a) 50 to 250 grams/cubic meter of the juice wherein (a) comprises 1 to 7 weight percent of ($a_2$) and 1 to 7 weight percent of ($a_3$); and (b) 2 to 4 p.p.m. of the juice;
(4) first heating of the juice at 80° to 90° C.;
(5) first filtering of the juice to separate solids;
(6) first carbonatating of the juice to attain a pH of 10.4 to 10.6;
(7) second heating of the juice at 70° to 75° C.;
(8) second filtering of the juice to separate any solids from the juice;
(9) second carbonatating of the juice at up to 75° C. to attain a pH of 8.3 to 8.5;
(10) third heating for 2 to 3 minutes at 101° to 103° C.;
(11) third purifying with the composition of step (1) wherein the components are present to the same extent as in step (1);
(12) third filtering of the juice to separate any residual solids and to produce a high grade purified sugar beet juice.

8. A process for purifying raw beet juice prior to the refining process comprising the steps of: (1) treating slightly acidic raw sugar beet juice with: (a) a mixture of ($a_1$) an inorganic suspending agent selected from the group consisting of montmorillonite clays, kaolin, bentonite and modified bentonites, fuller's earths, various types of diatomite, kieselguhr, sepiolite, bauxite, aluminum oxide and aluminum salts, sodium and potassium aluminates, alkaline phosphates, ammonium phosphates, alkaline polyphosphates, silica and mixtures thereof, and a material selected from the group consisting of ($a_2$) and ($a_2$)+($a_3$) wherein ($a_2$) is a non-toxic organic quaternary nitrogen salt decolorant and ($a_3$) is a non-toxic polyethyleneamine having a molecular weight of at least 40,000 and with (b) a flocculating quantity of a polyacrylic flocculant, (2) adding CaO in a predefecating amount to change the slightly acidic juice to an alkaline juice, (3) adding additional quantities of (a) and (b) to further purify the alkaline juice, (4) filtering the juice, (5) carbonatating the juice to further purify it, (6) heating the juice to facilitate filtering, and (7) filtering the heated juice.

9. Process of claim 8, wherein in step (5) $CO_2$ is added to adjust pH to about 8.3 to 8.5 and in step (6) the mixture is heated to about 100–103° C.

References Cited
UNITED STATES PATENTS

| | | | |
|---|---|---|---|
| 3,166,442 | 1/1965 | Duke | 127—50 X |
| 3,698,951 | 10/1972 | Bennett | 127—48 |
| 3,418,165 | 12/1968 | Rabe | 127—48 |
| 1,578,463 | 3/1926 | Nicholson | 127—48 |
| 2,389,119 | 11/1945 | Cantor | 127—46 R |
| 2,522,797 | 9/1950 | Paley | 127—46 R |
| 2,539,397 | 1/1951 | Bottoms | 127—48 |
| 2,595,943 | 5/1952 | Heinemann | 127—46 R |
| 3,479,221 | 11/1969 | Buhl | 127—48 X |
| 3,508,965 | 4/1970 | Harrison | 127—46 R |

MORRIS O. WOLK, Primary Examiner

S. MARANTZ, Assistant Examiner

U.S. Cl. X.R.

127—50

UNITED STATES PATENT OFFICE
CERTIFICATE OF CORRECTION

Patent No. 3,806,364                    Dated April 23, 1974

Inventor(s)   MARIA ROSA GASCO

It is certified that error appears in the above-identified patent and that said Letters Patent are hereby corrected as shown below:

(1) Column 1, line 30, after "of", insert --not less than--.
(2) Column 3, line 62, "(a₁)" should read --(a)--.
(3) Column 3, line 68, "(a₁)" should read --(a)--.
(4) Column 6, line 8, "26.7-32.2°F" should read --176.0-194.0°F--.
(5) Column 6, line 24, "Stammer" should be capitalized.
(6) Column 6, line 57, delete "filter preceding to", and insert --preceding first filter-- after "carbonation".
(7) Column 6, line 72, change "A and 115 p.p.m. C" to --A II S and 3 p.p.m.--.
(8) Column 7, line 8, the percentages should read --0.005-0.006%--.
(9) Column 7, line 41, after "boiler", insert --heat--.
(10) Column 7, line 43, after "p.p.m.", insert --BIS and 3 p.p.m.--.
(11) Column 7, last line, after "F", delete the "1".
(12) Column 8, line 3, after "an", insert --heat--.
(13) Column 8, line 34, "polyethyleneamine" should read --polyethyleneimine--.
(14) Column 8, line 34, after "(b)", insert --is a--.
(15) Column 8, line 64, correct the spelling of "composition".
(16) Column 9, line 5, change polyethyleneamine" to --polyethyleneimine--.
(17) Column 9, line 8, after "of", insert --not less than--.
(18) Column 10, line 17, change "polytheyleneamine" to --polyethyleneimine--.

Signed and sealed this 5th day of November 1974.

(SEAL)
Attest:

McCOY M. GIBSON JR.
Attesting Officer

C. MARSHALL DANN
Commissioner of Patents